United States Patent
Noro et al.

(10) Patent No.: US 10,408,312 B2
(45) Date of Patent: Sep. 10, 2019

(54) TENSIONER LEVER

(71) Applicant: TSUBAKIMOTO CHAIN CO., Osaka-shi, Osaka (JP)

(72) Inventors: Kazushi Noro, Osaka (JP); Toyonaga Saitoh, Osaka (JP)

(73) Assignee: TSUBAKIMOTO CHAIN CO., Osaka-shi (JP)

( * ) Notice: Subject to any disclaimer, the term of this patent is extended or adjusted under 35 U.S.C. 154(b) by 413 days.

(21) Appl. No.: 15/381,228

(22) Filed: Dec. 16, 2016

(65) Prior Publication Data

US 2017/0184183 A1 Jun. 29, 2017

(30) Foreign Application Priority Data

Dec. 24, 2015 (JP) .................................. 2015-250891

(51) Int. Cl.
*F16H 7/08* (2006.01)

(52) U.S. Cl.
CPC ......... *F16H 7/08* (2013.01); *F16H 2007/081* (2013.01); *F16H 2007/0846* (2013.01); *F16H 2007/0872* (2013.01); *F16H 2007/0893* (2013.01)

(58) Field of Classification Search
CPC ....... F16H 2007/081; F16H 2007/0846; F16H 2007/0872; F16H 2007/0893
USPC ........................................................ 474/204
See application file for complete search history.

(56) References Cited

U.S. PATENT DOCUMENTS

| | | | | |
|---|---|---|---|---|
| 2006/0270500 A1* | 11/2006 | Yamamoto | ............ | F16H 7/0836 474/109 |
| 2007/0213152 A1* | 9/2007 | Yamamoto | ............ | F16H 7/0848 474/109 |
| 2009/0111629 A1* | 4/2009 | Kobara | .................... | F02B 67/06 474/111 |
| 2010/0222167 A1* | 9/2010 | Chekansky | ........... | F16H 7/0836 474/110 |
| 2013/0190117 A1* | 7/2013 | Bauer | ....................... | F16H 7/08 474/111 |

(Continued)

FOREIGN PATENT DOCUMENTS

JP 2009-108909 A 5/2009
JP 2012-36996 A 2/2012

*Primary Examiner* — William E Dondero
*Assistant Examiner* — Mark K Buse
(74) *Attorney, Agent, or Firm* — Westerman, Hattori, Daniels & Adrian, LLP

(57) ABSTRACT

The invention provides a simple-structured tensioner lever capable of suppressing deflection of a stopper member and allows smooth assembly of the tensioner lever into an engine. The tensioner lever includes a stopper member for locking a coil spring, this stopper member including: a stopper pin portion inserted into a pin hole; a stopper front side extension portion continuous with one end of the stopper pin portion and protruding toward a base front surface; a stopper rear side extension portion continuous with the other end of the stopper pin portion and protruding toward a base rear surface; a spring lock portion formed in the stopper rear side extension portion and making engagement with a spring support arm; and a stopper movement restricting portion making engagement with the spring support arm to restrict movement of the spring support arm in a direction away from the base rear surface.

11 Claims, 9 Drawing Sheets

(56) References Cited

U.S. PATENT DOCUMENTS

2013/0203534 A1* 8/2013 Schmid ............... F16H 7/0836
474/101

* cited by examiner

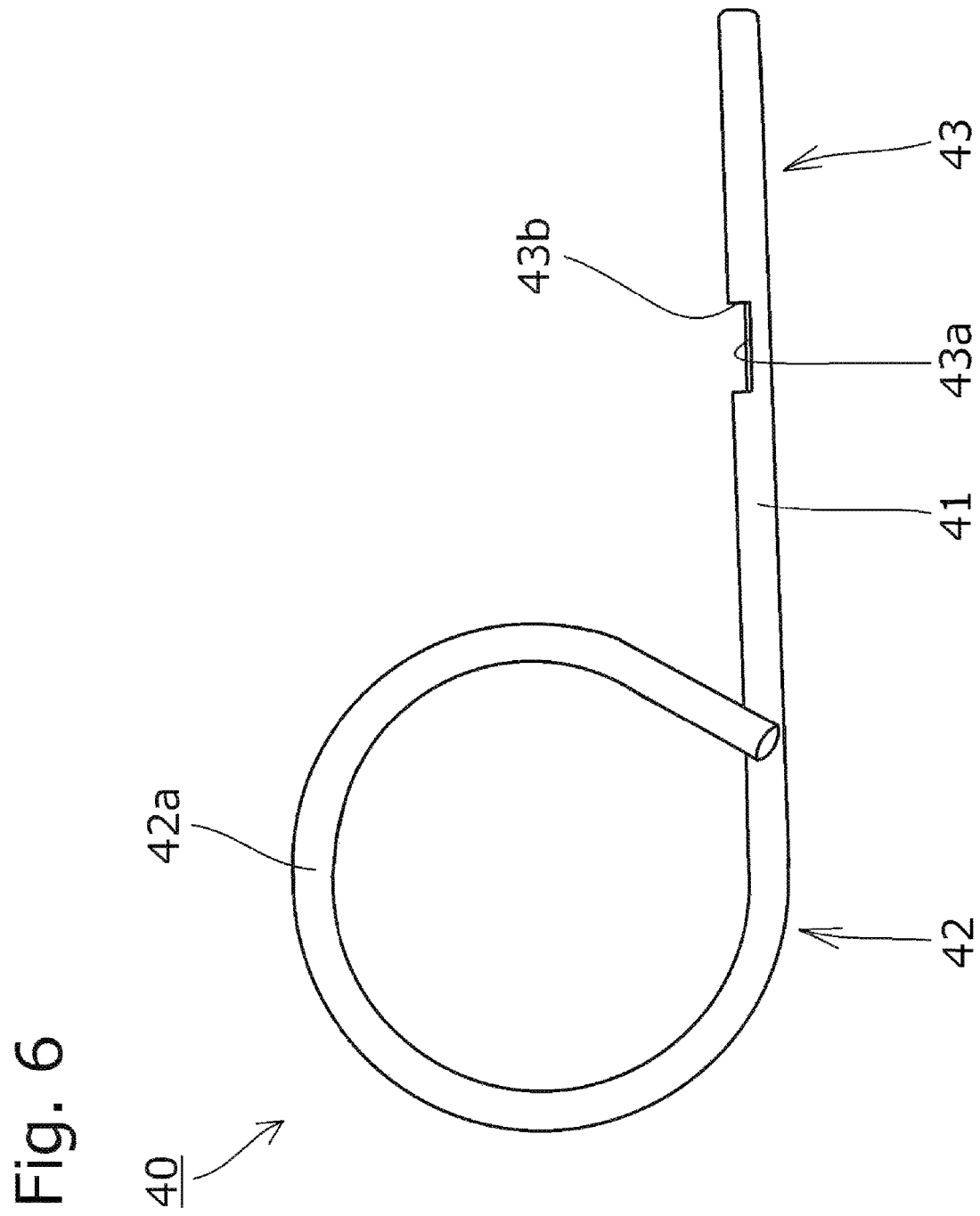

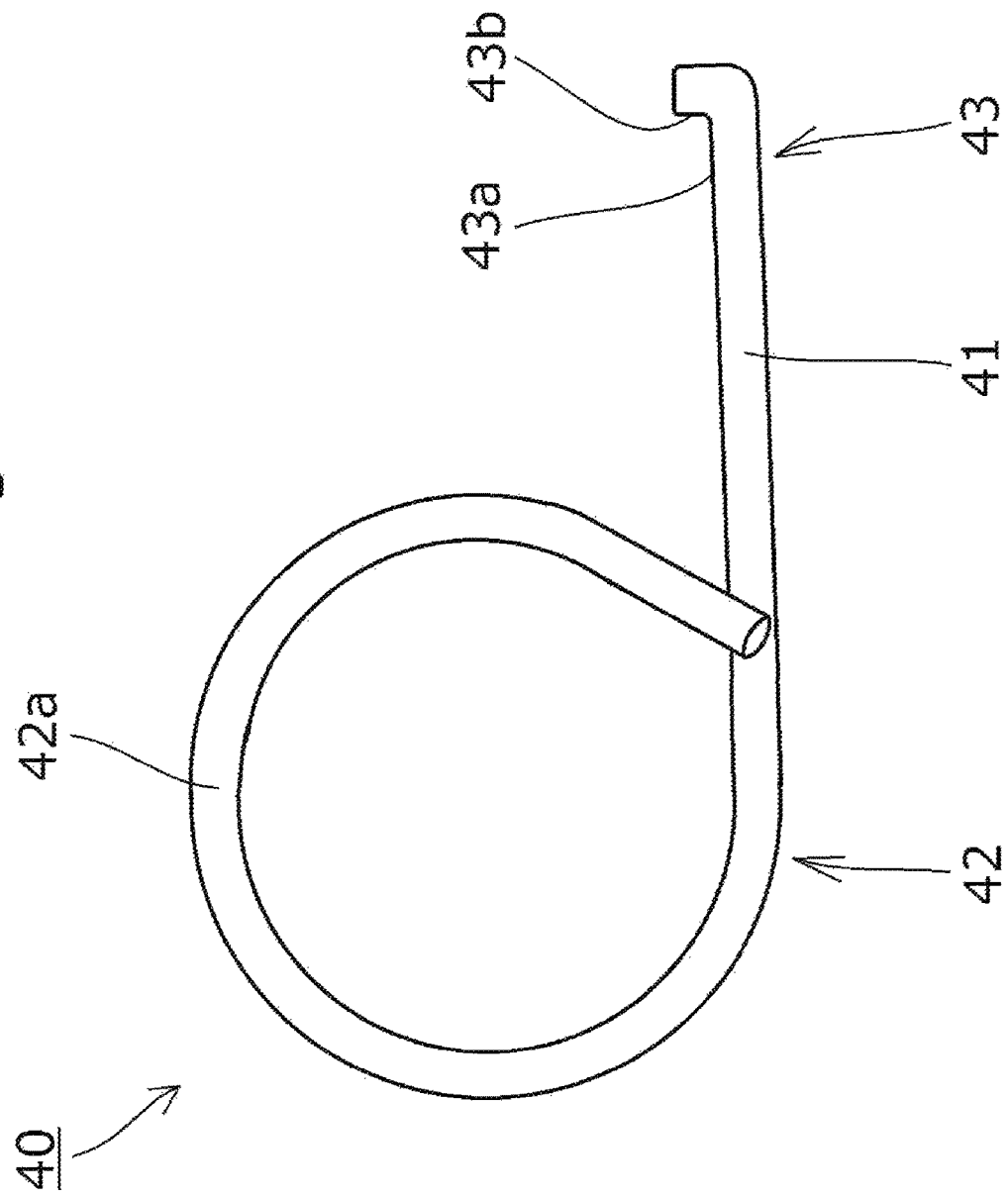

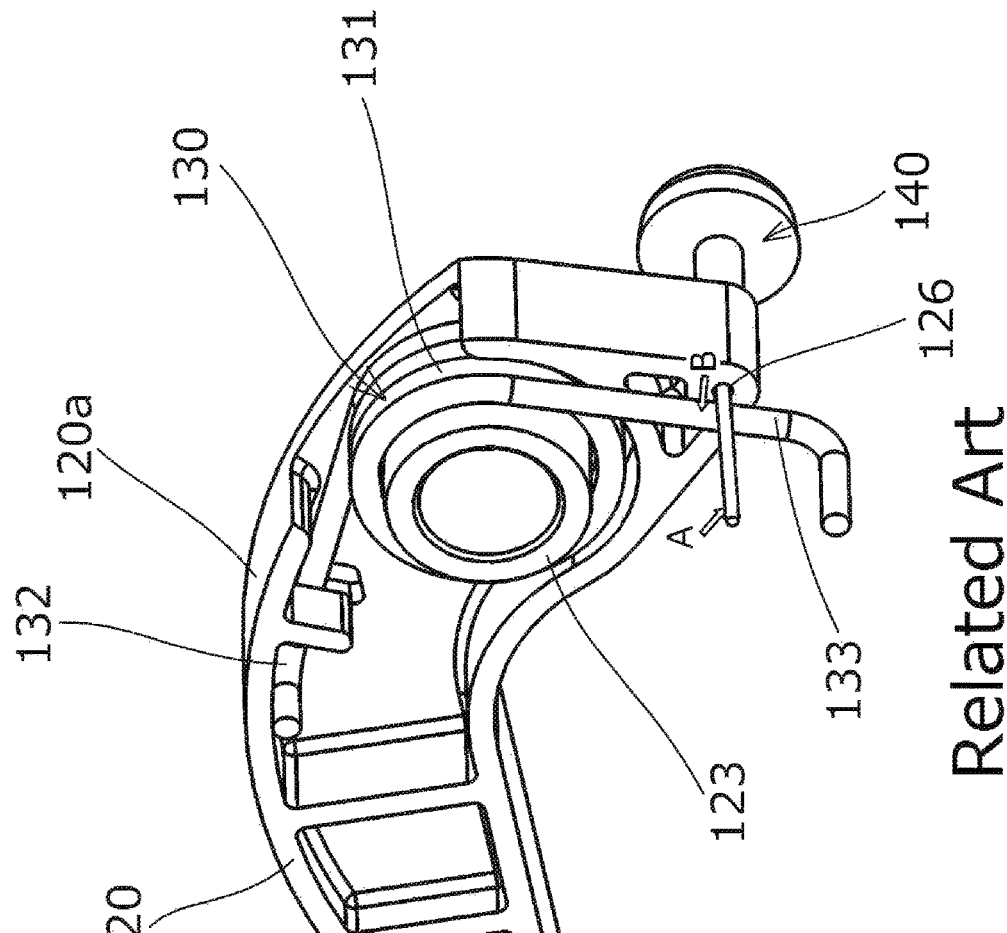

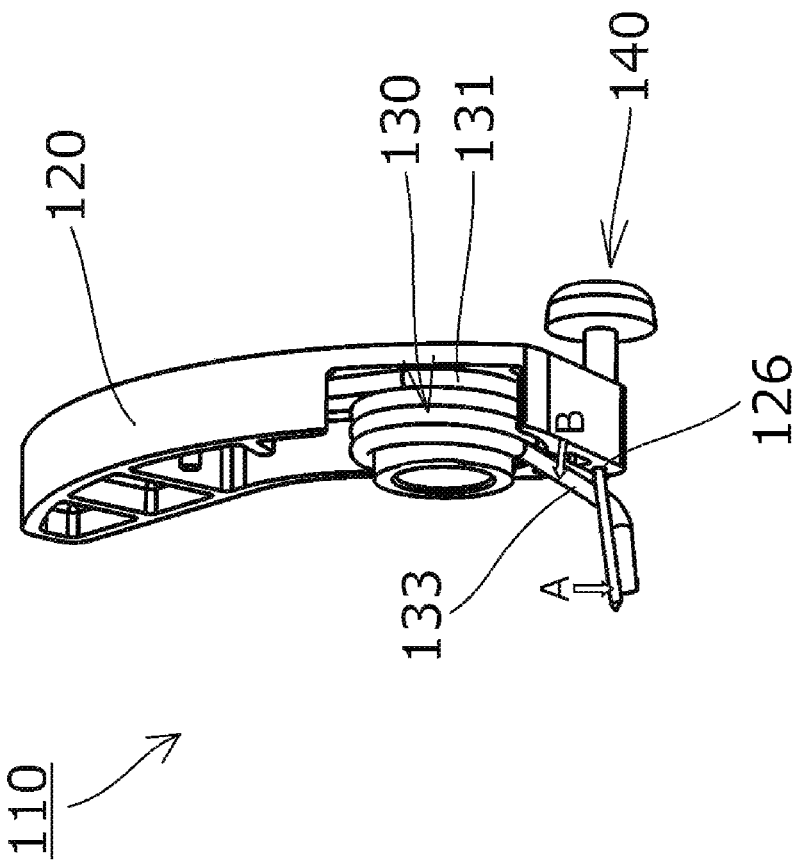

TENSIONER LEVER

BACKGROUND OF THE INVENTION

1. Field of the Invention

The present invention relates to a tensioner lever that slidably guides a running chain, and more particularly to a chain tensioner lever that slidably guides a chain by pressing a shoe surface of a lever body against the chain by the elastic force of a coil spring.

2. Description of the Related Art

Tensioner levers used to remove slackness in chains and to prevent vibration of running chains have been known. One such tensioner lever in a conventional chain transmission used for an auxiliary machine or the like of a car engine is a tensioner lever 110 that is pivotally attached to an attachment surface of an engine block or the like and includes, as shown in FIG. 8, a lever body 120 having a shoe surface 120a that slidably guides the chain, and a coil spring 130 interposed between the lever body 120 and an attachment surface (not shown) to press the shoe surface 120a toward the chain (see, for example, Japanese Patent Application Laid-open No. 2012-36996).

In such a tensioner lever 110, as shown in FIG. 8, a spring helical part 131 of the coil spring 130 is loosely fitted on a boss 123 protruded from a base part of the lever body 120 toward the attachment surface. A spring pressing arm 132 extending from one end of the spring helical part 131 is in contact with the lever body 120.

With the tensioner lever 110 being attached to the attachment surface, a spring support arm 133 extending from the other end of the spring helical part 131 is inserted in a spring holder hole formed in the attachment surface. Before the tensioner lever 110 is attached to the attachment surface, i.e., during storage or transport, the spring support arm 133 is locked by a pin-like stopper member 140 inserted in a pin hole 126 of the lever body 120.

SUMMARY OF THE INVENTION

However, the coil spring 130 for pressing the lever body 120 of the tensioner lever 110 is designed to have a large spring force. When the tensioner lever 110 has been stored for a long time, with the stopper member 140 locking the coil spring 130, the stopper member 140 may sometimes suffer a slight deflection in the direction indicated with reference symbol A in FIGS. 8 and 9, due to the pressure from the coil spring 130.

When such deflection occurs in the stopper member 140, the spring support arm 133 may move, as guided by the deflected stopper member 140, in a direction away from the base rear surface of the lever body 120 as indicated with reference symbol B in FIGS. 8 and 9. When this happens, the stopper member 140 may be pressed by the spring support arm 133 at a position away from a stopper pin portion (not shown) inserted in the pin hole 126, which will cause the stopper member 140 to deflect even more.

There was a problem that such a stopper member 140 that had undergone a large deflection would not allow it to be easily drawn out from the pin hole 126 when the tensioner lever 110 was to be mounted in the engine.

An object of the present invention is to solve these problems and to provide a simple-structured tensioner lever that can minimize deflection of a stopper member to realize smooth assembly thereof into an engine.

The present invention provides a tensioner lever including a lever body having a shoe surface for slidably guiding a chain; a coil spring interposed between the lever body and an attachment surface of a mounting target to press the shoe surface toward the chain; and a stopper member that locks the coil spring. The lever body includes a base part, a shaft hole extending from a base front surface through a base rear surface of the base part, a cylindrical boss protruding from a peripheral edge of the shaft hole on the base rear surface, and a pin hole extending from the base front surface through the base rear surface. The coil spring includes a spring helical part disposed on the boss, a spring pressing arm extending from one end of the spring helical part and making contact with the lever body, and a spring support arm extending from the other end of the spring helical part and supported on the attachment surface. The stopper member includes a stopper pin portion inserted into the pin hole, a stopper front side extension portion continuous with one end of the stopper pin portion and protruding to a base front surface side, a stopper rear side extension portion continuous with the other end of the stopper pin portion and protruding to a base rear surface side, a spring lock portion formed to the stopper rear side extension portion and making engagement with the spring support arm, and a stopper movement restricting portion making engagement with the spring support arm to restrict movement of the spring support arm in a direction away from the base rear surface. The problems described above are thereby solved.

According to one aspect of the present invention, the stopper member includes a stopper movement restricting portion making engagement with the spring support arm to restrict movement of the spring support arm in a direction away from the base rear surface. This can prevent a situation wherein the spring support arm moves away from the base rear surface and pushes the stopper rear side extension portion at a position away from the stopper pin portion inserted in the pin hole. Thus the stopper rear side extension portion is prevented from being deflected largely. This way, the removability of the stopper member from the lever body can be preserved, and the tensioner lever can be smoothly mounted into the engine.

According to another aspect of the present invention, a stopper movement restricting portion is provided to the stopper front side extension portion that extends from the base front surface side toward the base rear surface side along an outer side of a base side face. Unlike a configuration wherein the stopper movement restricting portion is provided to the stopper front side extension portion, the stopper movement restricting portion need not pass through the pin hole of the lever body when the stopper member is drawn out of the lever body, so that a certain degree of freedom in design of the stopper movement restricting portion can be ensured.

According to yet another aspect of the present invention, the stopper movement restricting portion is formed to the stopper rear side extension portion and in a step-like shape that makes engagement with the spring support arm. Such a step-like stopper movement restricting portion can be formed through simple processing such as providing a recess in an outer circumferential surface of the stopper rear side extension portion, or bending the stopper rear side extension portion, so that the processing cost for the stopper member can be reduced.

According to a further aspect of the present invention, the stopper member is formed such as to be turned about the stopper pin portion inserted in the shaft hole to cause the stopper movement restricting portion to make engagement with a rear side of the spring support arm. To remove the stopper member, the stopper member is turned so as to disengage the stopper movement restricting portion from the spring support arm, after which the stopper member is drawn out toward the base front surface side. Since the stopper member can be removed by such a simple operation, the tensioner lever can be easily mounted into the engine.

According to another aspect of the present invention, the stopper operating bent portion includes a portion that is located farther away from the stopper pin portion in an axial direction thereof than a distance between the stopper pin portion and the stopper movement restricting portion. Therefore, the stopper movement restricting portion can be engaged with and disengaged from the spring support arm with a small force by the use of leverage.

According to yet another aspect of the present invention, the first end and the second end of the stopper operating bent portion are disposed to face each other in a rotating direction of the stopper member about the stopper pin portion. When the stopper operating bent portion is turned to cause the stopper movement restricting portion to be engaged or disengaged, the first end and the second end of the stopper operating bent portion contact each other and thereby favorably transmit the torque of the stopper operating bent portion to the stopper movement restricting portion.

According to a further aspect of the present invention, the portion where the first end and the second end of the stopper operating bent portion face each other has a length set larger than a cross-sectional diameter of the stopper operating bent portion. When the stopper operating bent portion is turned to cause the stopper movement restricting portion to be engaged or disengaged, the first end and the second end of the stopper operating bent portion are kept in good contact with each other and thereby reliably transmit the torque of the stopper operating bent portion to the stopper movement restricting portion.

According to another aspect of the present invention, the stopper member is formed such as to be turned about the stopper pin portion in a same direction as the direction in which the lever body is biased by the spring pressing arm about the spring helical part, so as to cause the stopper movement restricting portion to be disengaged from the spring support arm. Therefore, when the stopper member is turned to disengage the stopper movement restricting portion from the spring support arm, the lever body is prevented from turning about the pivot shaft inserted in the shaft hole together with the rotating stopper member, so that the stopper member alone can reliably be turned relative to the lever body. That is, when the tensioner lever is installed in the engine, the chain is in contact with the shoe surface of the lever body, so that the lever body is restricted by the chain from rotating in the direction in which the lever body is biased by the spring pressing arm. Therefore, the lever body is prevented from turning with the rotation of the stopper member.

According to yet another aspect of the present invention, the stopper front side extension portion includes an opposite portion located opposite and in front of the base front surface. Since the base front surface and the spring support arm can be sandwiched in the front to back direction by the opposite portion located opposite and in front of the base front surface and the stopper movement restricting portion disposed on the rear side of the spring support arm, the spring support arm can be reliably prevented from moving toward the rear side.

According to a further aspect of the present invention, the opposite portion of the stopper front side extension portion has a length set larger than a cross-sectional diameter of the opposite portion, so that the base front surface and the opposite portion can be kept in good contact with each other, and the opposite portion and the stopper movement restricting portion can stably sandwich the base front surface and the spring support arm.

According to another aspect of the present invention, the stopper front side extension portion includes a stopper operating bent portion that can be operated by a user, so that various operations such as turning the stopper member about the stopper pin portion inserted in the shaft hole of the lever body, and drawing out the stopper member toward the base front surface side, can be easily performed with the use of the stopper operating bent portion, which can be formed by bending a pin-like material.

BRIEF DESCRIPTION OF THE DRAWINGS

FIG. 6 is a perspective view illustrating a stopper member in the second embodiment;

FIG. 7 is a perspective view illustrating a variation example of the stopper member in the second embodiment;

FIG. 8 illustrates a conventional tensioner lever for reference; and

FIG. 9 illustrates the conventional tensioner lever seen from a different angle from the angle of FIG. 8 for reference.

DESCRIPTION OF THE PREFERRED EMBODIMENTS

A tensioner lever 10 according to a first embodiment of the present invention will be hereinafter described with reference to the drawings.

Figure 1:
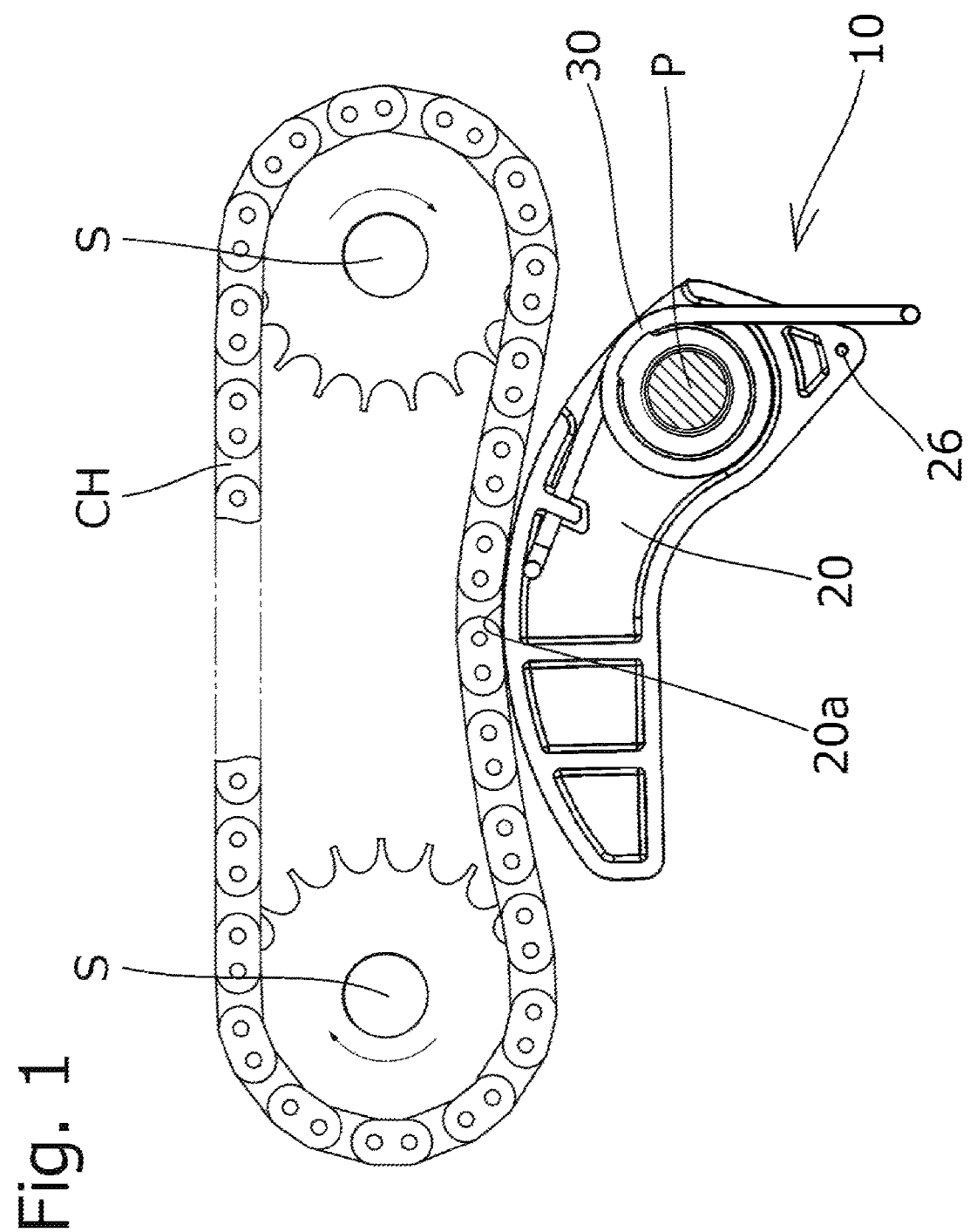
FIG. 1 is a diagram illustrating one form of use of a tensioner lever according to a first embodiment of the present invention viewed from an attachment surface side.

The tensioner lever 10, as shown in FIG. 1, is pivotably mounted on a pivot shaft P protruding from an attachment surface (not shown) of an object to which the tensioner lever is mounted, such as an engine block (not shown), so as to slidably guide a chain CH running between a plurality of sprockets S to keep an appropriate chain tension.

Figure 2:
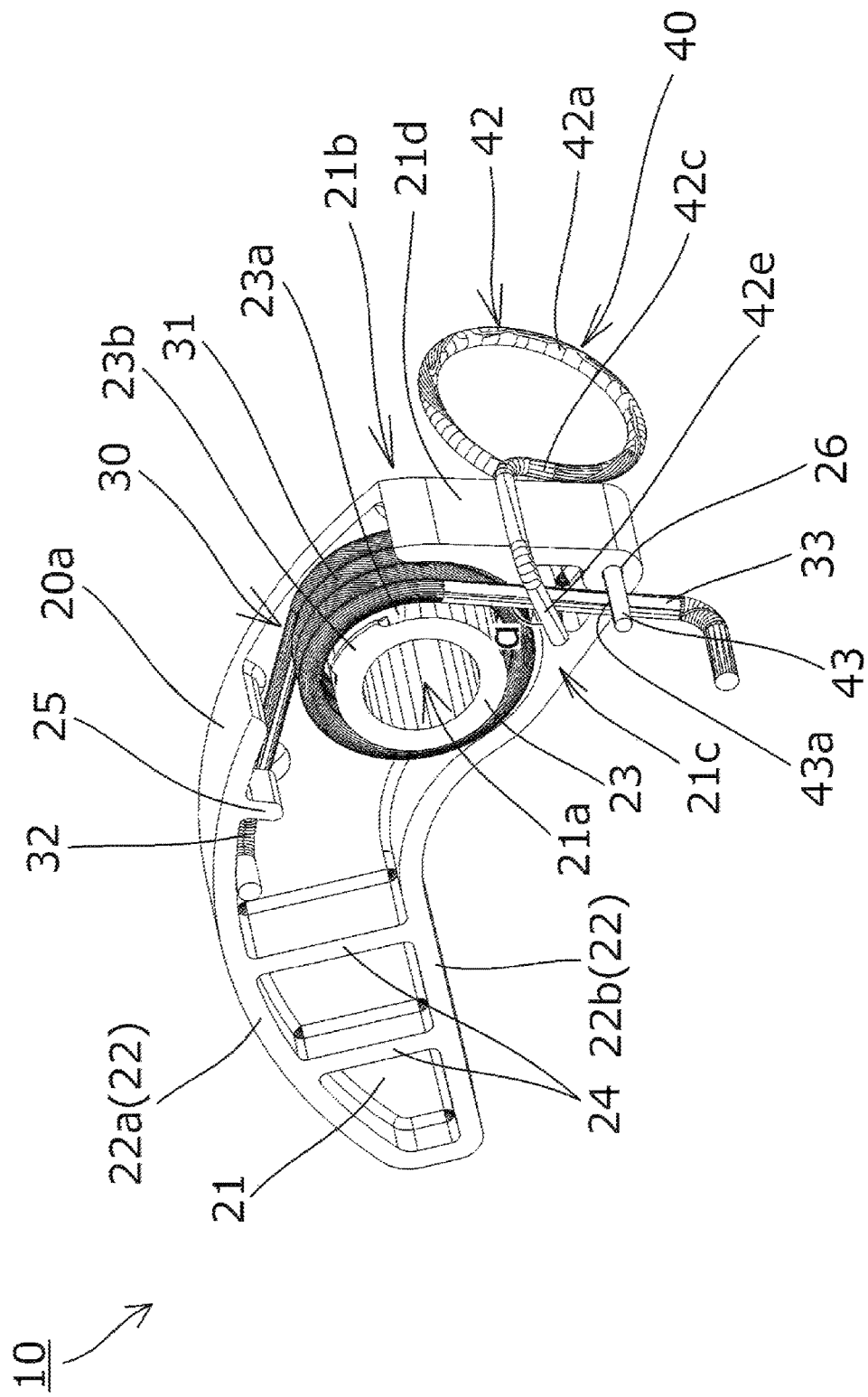
FIG. 2 is a perspective view illustrating the tensioner lever.

As shown in FIGS. 1 and 2, the tensioner lever 10 includes a lever body 20 made of a synthetic resin or the like, a coil spring 30 made of metal or the like, and a stopper member 40 made of metal or the like.

Figure 3:
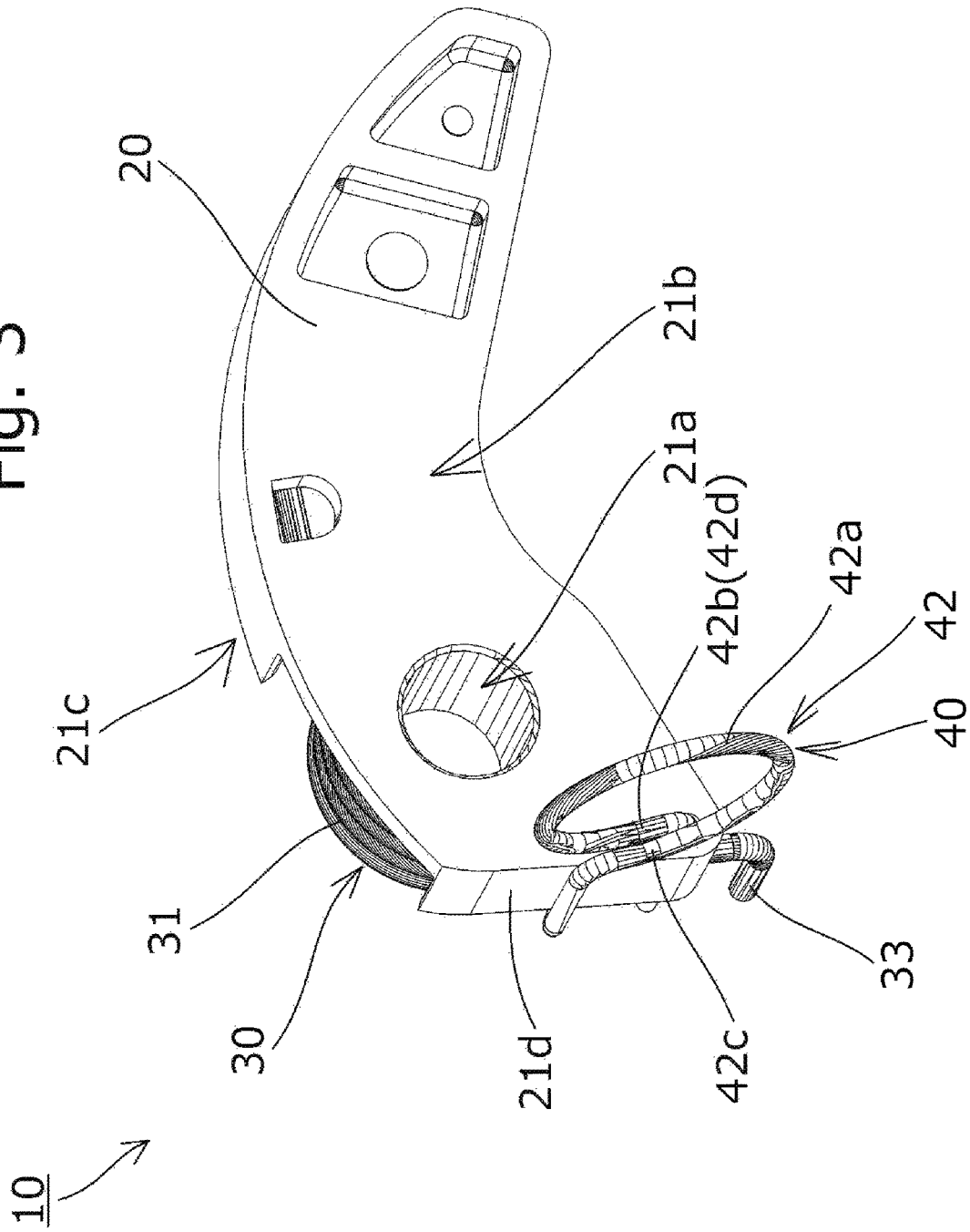
FIG. 3 is a perspective view illustrating the tensioner lever seen from a different angle from the angle of FIG. 2.

The lever body 20 includes, as shown in FIGS. 2 and 3, a planar base part 21 disposed a certain distance away from the attachment surface, a lever circumferential wall 22 standing upright from the peripheral edge of the base part 21 toward the attachment surface, a cylindrical boss 23 protruding from the peripheral edge of a shaft hole 21a formed in the base part 21 toward the attachment surface (toward a base rear surface 21c side), a plurality of reinforcing ribs 24 formed between a chain-side circumferential wall 22a and a non-chain-side circumferential wall 22b of the lever circumferential wall 22, a spring lock portion 25 that protrudes from an inner surface of the chain-side circumferential wall 22a for locking a spring pressing arm 32 of the coil spring 30, and a pin hole 26 for the stopper member 40 to be inserted.

The shaft hole 21a extends from a base front surface 21b through the base rear surface 21c of the base part 21, and the pin hole 26 extends from the base front surface 21b through the base rear surface 21c.

A shoe surface 20a that slidably guides the chain CH is formed on a side face of the lever body 20 facing the chain CH (outer surface of the chain-side circumferential wall 22a).

The pivot shaft P is inserted into the shaft hole 21a and the boss 23 of the base part 21, whereby the lever body 20 is pivotably (rotatably) supported on the attachment surface.

The lever circumferential wall 22 includes the chain-side circumferential wall 22a disposed on the chain CH side and the non-chain-side circumferential wall 22b. The chain-side circumferential wall 22a includes a cut-out region in a portion facing the spring helical part 31 of the coil spring 30.

The end face of the boss 23 on the attachment surface side is formed to protrude slightly more toward the attachment surface than the lever circumferential wall 22, which prevents other parts than this end face of the boss 23 on the attachment surface side from contacting the attachment surface, so that smooth pivoting (rotation) of the lever body 20 about the pivot shaft P is ensured.

A restricting protrusion 23b is formed on the outer circumferential surface 23a of the boss at the end on the attachment surface side to restrict the movement of a spring helical part 31 disposed on the outer circumferential surface 23a of the boss toward the attachment surface side. This way, in a state before the tensioner lever 10 is attached to the attachment surface, the coil spring 30 is prevented from coming off of the lever body 20, and also, in a state where the tensioner lever 10 is attached to the attachment surface, the coil spring 30 is prevented from interfering with the attachment surface.

The coil spring 30 is interposed between the lever body 20 and the attachment surface when the tensioner lever 10 is attached to the attachment surface as shown in FIGS. 1 and 2 to press the shoe surface 20a of the lever body 20 toward the chain CH by the elastic force it generates. As shown in FIGS. 2 and 3, the coil spring includes the spring helical part 31, the spring pressing arm 32 extending from one end of the spring helical part 31, and a spring support arm 33 extending from the other end of the spring helical part 31.

The spring helical part 31 loosely fits on the outer circumferential surface 23a of the boss 23, i.e., is disposed with a gap between itself and the outer circumferential surface 23a of the boss, as shown in FIGS. 2 and 3.

The spring pressing arm 32 is disposed such that part of it is in contact with an inner surface of the chain-side circumferential wall 22a.

The spring support arm 33 has a distal end that is bent toward the attachment surface. When the tensioner lever 10 is attached to the attachment surface, the distal end of the spring support arm 33 is inserted in and supported by a spring holder hole (not shown) formed in the attachment surface. Before the tensioner lever 10 is attached to the attachment surface, the spring support arm is locked by the stopper member 40 as shown in FIG. 2.

The stopper member 40 is inserted in the pin hole 26 of the lever body 20 to temporarily lock the spring support arm 33, as shown in FIGS. 2 and 3, in a state before the tensioner lever 10 is attached to the attachment surface. When the tensioner lever 10 is attached to the attachment surface, the stopper member 40 has been pulled out from the pin hole 26 and removed as shown in FIG. 1.

Figure 4:
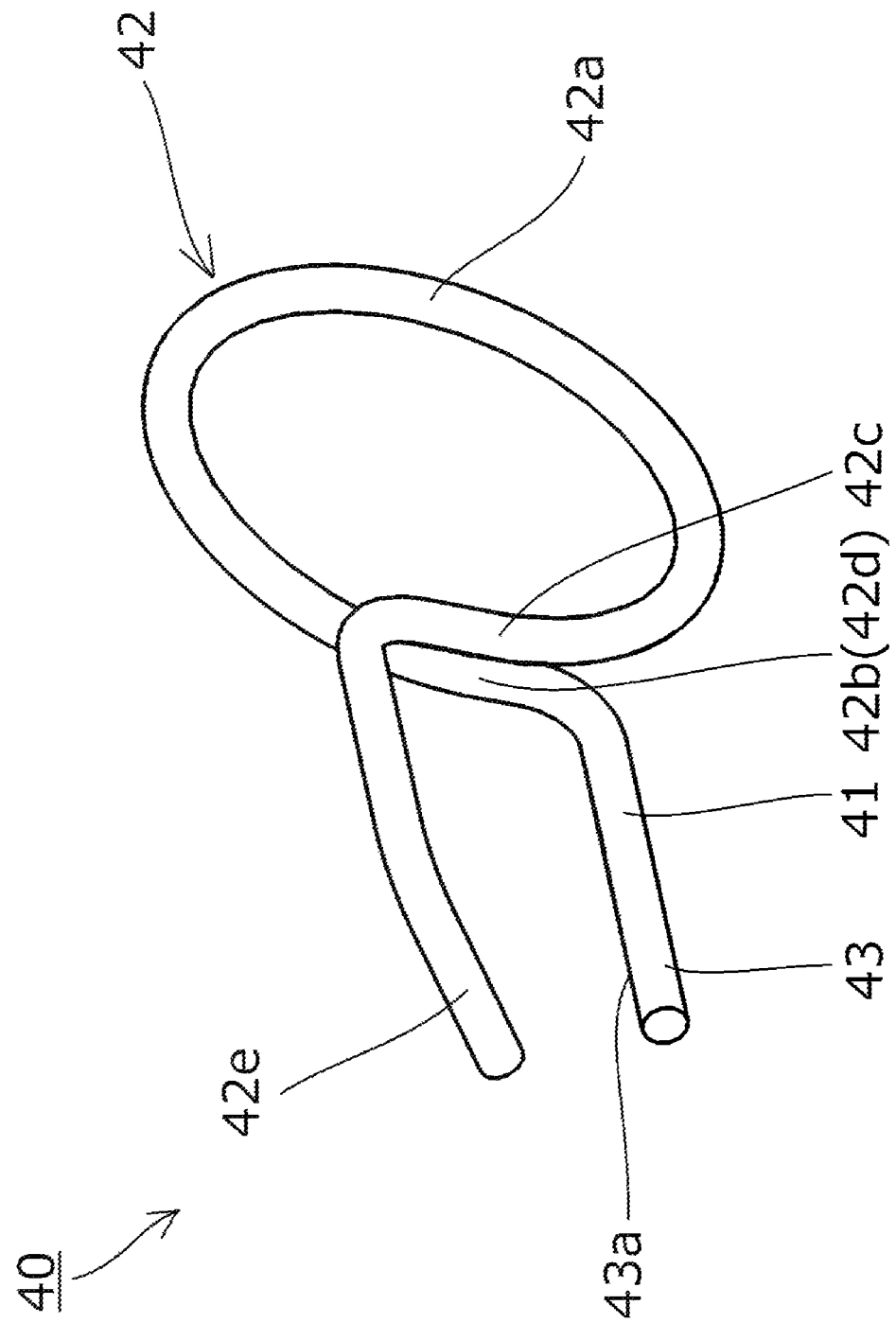
FIG. 4 is a perspective view illustrating a stopper member in the first embodiment.

The stopper member 40 is formed from a rod-like material that is bent, and includes, as shown in FIG. 2 to FIG. 4, a straight stopper pin portion 41 inserted into the pin hole 26 of the lever body 20, a stopper front side extension portion 42 continuous with one end of the stopper pin portion 41 and protruding to the base front surface 21b side, and a stopper rear side extension portion 43 continuous with the other end of the stopper pin portion 41 and protruding to the base rear surface 21c side.

The stopper front side extension portion 42 is formed from a rod-like material and bent, as shown in FIGS. 2 and 3, such as to extend from the base front surface 21b side toward the base rear surface 21c side along the outer side of a base side face 21d of the base part 21.

The stopper front side extension portion 42 includes, as shown in FIGS. 2 to 4, a stopper operating bent portion 42a continuous with one end of the stopper pin portion 41, and a stopper movement restricting portion 42e provided at a portion on the base rear surface 21c side.

The stopper operating bent portion 42a is formed in an arcuate, ring-like shape so that a user's finger can be inserted. The specific shape of the stopper operating bent portion 42a is not limited to the one described above. The bent portion may have, for example, a shape that allows the user to pinch it to operate the stopper member 40.

The stopper operating bent portion 42a includes, as shown in FIGS. 3 and 4, a first end 42b that is one end continuous with the stopper tin portion 41, and a second end 42c that is the other end. The first end 42b and the second end 42c are located to face each other in a rotating direction of the stopper member 40 about the stopper pin portion 41.

The length of a portion where these first end 42b and second end 42c face each other (i.e., length in the longitudinal direction of the pin-like material of the stopper member 40) is set larger than the cross-sectional diameter of the stopper operating bent portion 42a (i.e., cross-sectional diameter of the pin-like material of the stopper member 40).

The stopper operating bent portion 42a further includes a portion that is located farther away from the stopper pin portion 41 in an axial direction thereof than the distance between the stopper pin portion 41 and the stopper movement restricting portion 42e.

The stopper movement restricting portion 42e makes engagement with the rear side of the spring support arm 33 on the base rear surface 21c side as shown in FIG. 2, so as to restrict the movement of the spring support arm 33 rearward, i.e., in the direction away from the base rear surface 21c.

The stopper movement restricting portion 42e is positioned to intersect the spring support arm 33 at an angle α of 90° or more as shown in FIG. 2, so that the stopper movement restricting portion 42e is prevented from being accidentally disengaged from the spring support arm 33.

The stopper front side extension portion 42 includes an opposite portion 42d that is located opposite and in front of the base front surface 21b as shown in FIG. 3. In this embodiment, the first end 42b of the stopper operating bent portion 42a functions as the opposite portion 42d.

The length of the opposite portion 42d facing the base front surface 21b (i.e., length in the longitudinal direction of the pin-like material of the stopper member 40) is set larger than the cross-sectional diameter of the opposite portion 42d (i.e., cross-sectional diameter of the pin-like material of the stopper member 40).

The stopper rear side extension portion 43 is formed continuous with the stopper pin portion 41 and straight as shown in FIGS. 2 and 4. Part of the stopper rear side extension portion 43 functions as a spring lock portion 43a that makes engagement with the spring support arm 33.

Next, how to remove the stopper member 40 from the lever body 20 will be described below.

First, the user inserts a finger into the stopper operating bent portion 42a and turns the stopper member 40 about the stopper pin portion 41 inserted in the shaft hole 21a, whereby the stopper movement restricting portion 42e is disengaged from the rear side of the spring support arm 33.

In this embodiment, to disengage the stopper movement restricting portion 42e, the stopper member 40 is turned in the same direction as that (clockwise in FIG. 2) in which the lever body 20 is biased by the spring pressing arm 32 about the spring helical part 31. Instead, the stopper member 40 may be configured to be turned in the opposite direction from that of the lever body 20 in which it is biased by the spring pressing arm 32 about the spring helical part 31.

Next, the stopper member 40 is pulled to the base front surface 21b side so that the stopper pin portion 41 and the stopper rear side extension portion 43 are drawn out of the pin hole 26 in the lever body 20, and thus the stopper member 40 is removed.

Next, a tensioner lever 10 according to a second embodiment of the present invention will be described with reference to FIGS. 5 to 7. The second embodiment is, in part, exactly the same as the previously described first embodiment, and therefore its configurations will not be described except for the differences.

In the tensioner lever 10 of the first embodiment, the stopper movement restricting portion 42e that restricts movement of the spring support arm 33 toward the rear side is formed to the stopper front side extension portion 42. In the tensioner lever 10 of the second embodiment, a stopper movement restricting portion 43b is formed to the stopper rear side extension portion 43.

Figure 5:
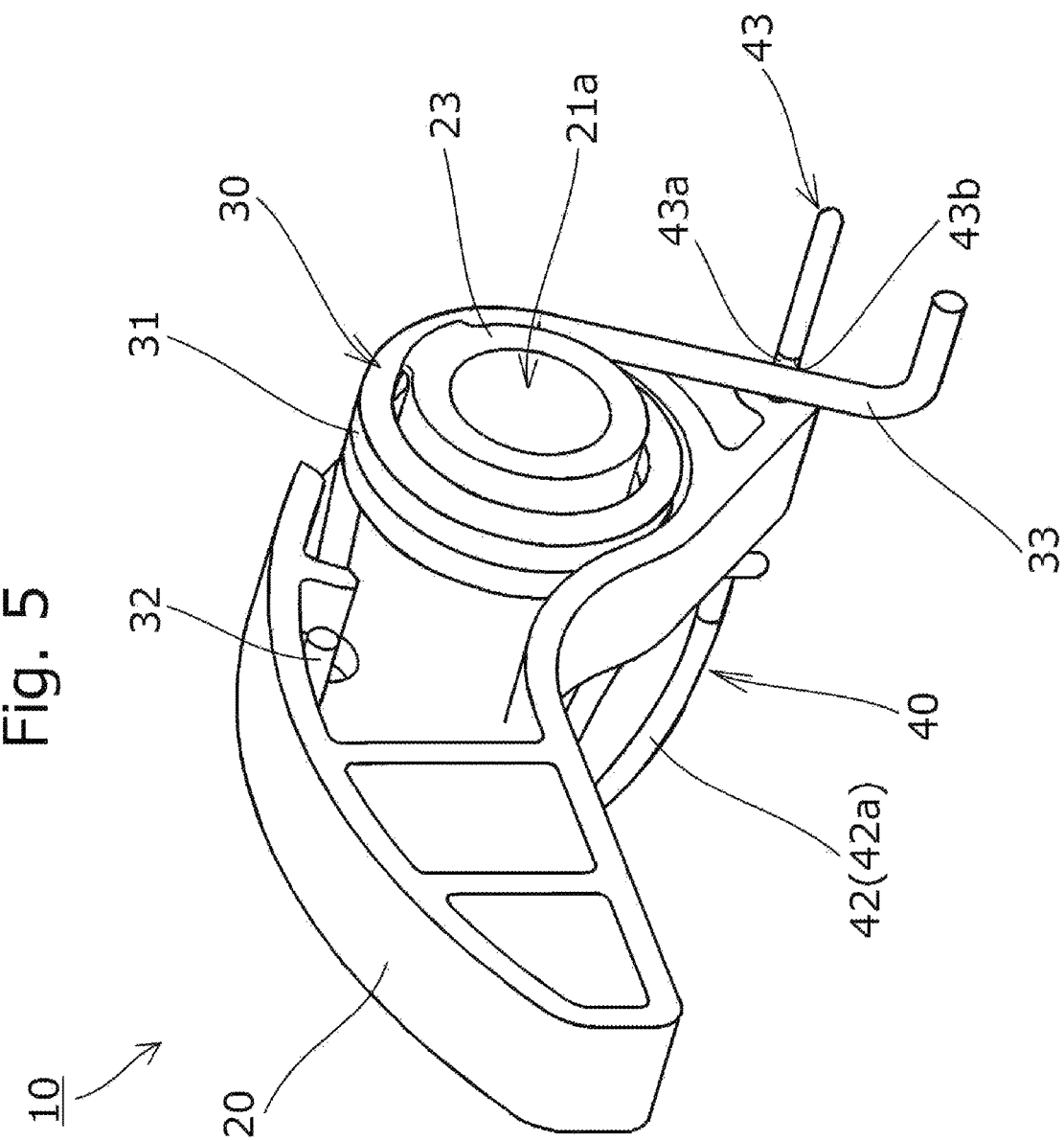
FIG. 5 is a perspective view illustrating a tensioner lever according to a second embodiment of the present invention.

More specifically, in the second embodiment, as shown in FIGS. 5 and 6, a recess is formed in an outer circumferential surface of the stopper rear side extension portion 43, and the bottom of this recess functions as the spring lock portion 43a, while an inner side face of this recess functions as the step-like stopper movement restricting portion 43b that makes engagement with the rear side of the spring support arm 33.

The stopper movement restricting portion 43b is not limited to the specific form described above, and may be formed, for example, by bending the stopper rear side extension portion 43 as shown in FIG. 7. In this case, the pin hole 26 in the lever body 20 may be formed to have an oval cross-sectional shape.

While the embodiments of the present invention have been described in detail, the present invention is not limited to the above-described embodiments and may be carried out with various design changes without departing from the scope of the present invention set forth in the claims.

For example, while the tensioner lever was described as a component to be incorporated in a timing system of an engine in the embodiments above, the tensioner lever can be applied to various other equipment other than this.

The chain tensioner may not necessarily be applied to a chain transmission mechanism but also used for similar transmission mechanisms that use belts, ropes and the like, and can be applied in a variety of industrial fields.

In the embodiments described above, the pivot shaft protruding from the attachment surface of an engine block or the like is inserted into the shaft hole in the lever body. Instead, a bolt or the like inserted into the shaft hole of the lever body may be attached to the attachment surface of an engine block or the like.

What is claimed is:

1. A tensioner lever comprising: a lever body having a shoe surface for slidably guiding a chain; a coil spring interposed between the lever body and an attachment surface of a mounting target and pressing the shoe surface toward the chain; and a stopper member that locks the coil spring, the lever body having a base part, a shaft hole extending from a base front surface to a base rear surface through the base part, a cylindrical boss protruding from a peripheral edge of the shaft hole on the base rear surface, and a pin hole extending from the base front surface to the base rear surface through the base part, the coil spring including a spring helical part disposed on the boss, a spring pressing arm extending from one end of the spring helical part and making contact with the lever body, and a spring support arm extending from the other end of the spring helical part and supported on the attachment surface, and the stopper member having a stopper pin portion inserted into the pin hole, a stopper front side extension portion continuous with one end of the stopper pin portion and protruding to a side of the base front surface, a stopper rear side extension portion continuous with the other end of the stopper pin portion and protruding to a side of the base rear surface, a spring lock portion formed in the stopper rear side extension portion and making engagement with the spring support arm, and a stopper movement restricting portion making engagement with the spring support arm to restrict movement of the spring support arm in a direction away from the base rear surface.

2. The tensioner lever according to claim 1, wherein the stopper front side extension portion is formed to extend from the base front surface side toward the base rear surface side along an outer side of a base side face of the base part, and the stopper movement restricting portion is provided in a portion of the stopper front side extension portion that is located on the base rear surface side.

3. The tensioner lever according to claim 1, wherein the stopper movement restricting portion is formed in a step-like shape that makes engagement with the spring support arm formed in the stopper rear side extension portion.

4. The tensioner lever according to claim 1, wherein the stopper member is formed so as to be turned about the stopper pin portion to cause the stopper movement restricting portion to make engagement with a rear side of the spring support arm.

5. The tensioner lever according to claim 4, wherein the stopper front side extension portion includes a stopper operating bent portion that can be operated by a user, and the stopper operating bent portion includes a portion that is located farther away from the stopper pin portion when seen in an axial direction thereof than a distance between the stopper pin portion and the stopper movement restricting portion.

6. The tensioner lever according to claim 4, wherein the stopper front side extension portion includes a stopper operating bent portion that can be operated by a user, the stopper operating bent portion includes a first end that is one end continuous with the stopper pin portion and a second end that is the other end, and the first end and the second end are disposed to face each other in a direction of rotation of the stopper member about the stopper pin portion.

7. The tensioner lever according to claim 6, wherein a portion where the first end and the second end face each other has a length set larger than a cross-sectional diameter of the stopper operating bent portion.

8. The tensioner lever according to claim 4, wherein the stopper member is formed so as to be turned about the stopper pin portion in the same direction as a direction in which the lever body is biased by the spring pressing arm about the spring helical part, thereby causing the stopper movement restricting portion to be disengaged from the spring support arm.

9. The tensioner lever according to claim 1, wherein the stopper front side extension portion includes an opposite portion located opposite and in front of the base front surface.

10. The tensioner lever according to claim 9, wherein the opposite portion has a length set larger than a cross-sectional diameter of the opposite portion.

11. The tensioner lever according to claim 1, wherein the stopper front side extension portion includes a stopper operating bent portion that can be operated by a user.

\* \* \* \* \*